Patented Apr. 13, 1937

2,077,171

UNITED STATES PATENT OFFICE 2,077,171

PROCESS FOR PRODUCTION OF FERTILIZERS

Edward W. Harvey, New Brunswick, N. J., and Russell M. Jones, Sheffield, Ala., assignors to The Barrett Company, New York, N. Y., a corporation of New Jersey No Drawing. Application February 26, 1934, Serial No. 713,046. In Canada December 18, 1930

3 Claims. (Cl. 71—43)

This application is a continuation in part of our copending United States application, Serial No. 485,298, filed September 29, 1930.

This invention relates to the production of fertilizers from a superphosphate (superphosphate or triple superphosphate) or mixtures containing a superphosphate, by the treatment of such material with ammonium nitrate and ammonia.

Superphosphate, which is the product obtained by decomposing phosphate rock with sulfuric acid, is commonly employed in the preparation of fertilizer mixtures as a source of phosphorus. It contains principally monocalcium phosphate and calcium sulfate. Triple superphosphate is prepared by decomposing phosphate rock with phosphoric acid, and principally consists of monocalcium phosphate with some free phosphoric acid. It is also desirable in preparing mixed fertilizers from a superphosphate to include a material containing nitrogen in a form in which it is available as a food for plants. Ammonia is a convenient and relatively inexpensive source of such nitrogen and is moreover a desirable addition to superphosphate because it neutralizes free acid therein and affords heat by chemical reaction which drives off a part of the free moisture. Accordingly, numerous procedures for the treatment of a superphosphate with ammonia have been proposed.

The addition of ammonia causes monocalcium acid phosphate of the superphosphate which is soluble in water to be transformed into a calcium phosphate which is relatively insoluble in water but soluble in citrate solution and is thus known as citrate-soluble. If a large amount of ammonia is added to superphosphate or triple superphosphate, an excessive amount of water soluble and citrate soluble phosphate, which are both considered available as plant food, is reverted to a citrate insoluble or unavailable form. Consequently, the amount of ammonia which heretofore could be added to superphosphate was limited and the advantages of this source of nitrogen in fertilizer mixtures containing superphosphate could not be fully secured.

It is an object of the present invention to reduce the formation of unavailable phosphorus in the treatment of superphosphate or mixtures containing the same with ammonia and to make possible the use of relatively large quantities of ammonia with such materials without excessively reducing the fertilizing value of the phosphate contained therein. It is a further object of this invention to provide a process for the preparation of mixed fertilizers including superphosphate, which fertilizers contain a relatively large proportion of nitrogen both as ammoniacal nitrogen and as nitrate nitrogen and in which the $P_2O_5$ content of the superphosphate remains in large part in the form in which it is available as plant food, particularly as citrate soluble $P_2O_5$.

In preparing mixed fertilizers in accordance with the present invention superphosphate or triple superphosphate is treated with ammonia either in the presence of ammonium nitrate or with ammonium nitrate mixed with the superphosphate after its treatment with the ammonia and water. The ammonia is employed in amount sufficient to cause reversion of available $P_2O_5$ of the superphosphate to an unavailable form except for the influence of the ammonium nitrate in repressing this tendency to cause reversion. In thus treating superphosphate, the ammonia is employed in amount corresponding to substantially more than 23 pounds $NH_3$ (at least 24 and preferably about 30 to 40 pounds $NH_3$) for every 1000 pounds of superphosphate. In treating a triple superphosphate, for example one containing about 45% $P_2O_5$, more than 57 pounds of ammonia are employed for every 1000 parts of triple superphosphate. These proportions of 23 and 57 pounds of ammonia to 1000 pounds of superphosphate and triple superphosphate, respectively, correspond to that given by the formula:

$$NH_3 = .00128 \times \% \ P_2O_5 \times \text{phosphate}$$

where $NH_3$=weight of ammonia in pounds

% $P_2O_5$=the percent of $P_2O_5$ in the superphosphate or triple superphosphate Phosphate=weight (in pounds) of the superphosphate or triple superphosphate being treated with the ammonia.

The ammonia may be added to the phosphate either as aqua ammonia, anhydrous liquid or gaseous ammonia. It is preferred to employ the ammonia either as aqua ammonia containing below about 40% $NH_3$ or as liquid anhydrous ammonia. When either gaseous or liquid anhydrous ammonia are used, it is preferred to also treat the phosphate with water in amount corresponding to a ratio of water to ammonia above about 3 to 2 by weight. The ammonia and water may simultaneously be added to the superphosphate, or in series, first one and then the other. The amount of ammonium nitrate may be varied within relatively wide limits. For example, 40 pounds or more of ammonium nitrate may be employed for every 1000 pounds of superphosphate, although it is preferred to employ from 100 to 200 pounds of ammonium nitrate for every 1000 pounds of superphosphate. The ammonium nitrate may be added as the solid mixed with the superphosphate prior to or simultaneously with the ammoniation of the superphosphate, or the superphosphate which has been ammoniated by treatment with ammonia and water may be mixed with solid ammonium nitrate. The ammonium nitrate also may be added simultaneously with the ammonia and/or the water as an aqueous solution or an anhydrous ammoniacal solution of the ammonium nitrate.

Particularly when employing relatively concentrated aqua ammonia or anhydrous liquid ammonia for the treatment of superphosphates in accordance with this invention, it is advantageous to employ the ammonium nitrate in solution in the ammoniacal liquid and to mix ammonium sulfate with the superphosphate, preferably before the addition to it of the ammoniacal solution of ammonium nitrate. Accordingly, this invention includes the preparation of fertilizers by treating a superphosphate with an ammoniacal solution of ammonium nitrate, containing for example, less than about 60 parts of water for every 40 parts of ammonia (corresponding to solutions of ammonium nitrate in liquid anhydrous ammonia or an aqua ammonia of a strength greater than about 40% $NH_3$) and mixing ammonium sulfate with the phosphate. The ammoniacal liquid is added to the phosphate in amount corresponding to the above proportions of ammonia to phosphate. The ammonium sulfate is preferably mixed with the phosphate either prior to or simultaneously with its treatment with the ammoniacal solution of ammonium nitrate.

The following examples are illustrative of this invention:

*Example I.*—Superphosphate and ammonium nitrate are mixed in the proportions of 1000 pounds of superphosphate to 100 pounds of ammonium nitrate. With this mixture there is incorporated 148 pounds of aqua ammonia containing 25% $NH_3$. The ammonia is thus added in the proportions of 37 pounds of ammonia for every 1000 pounds of superphosphate. The resulting mixture is allowed to cure and is then ready for shipment and use as a fertilizer.

The foregoing procedure may be modified to first incorporate with the superphosphate the aqua ammonia and then mix the ammonium nitrate with the ammoniated superphosphate.

*Example II.*—Superphosphate and ammonium nitrate are mixed in the proportions of 200 pounds of ammonium nitrate for every 1000 pounds of superphosphate. With this mixture there is incorporated 148 pounds of aqua ammonia containing 25% $NH_3$ and the resulting mixture allowed to cure.

*Example III.*—Ammonium nitrate is mixed with superphosphate in the proportions of about 100 pounds of ammonium nitrate to 1000 pounds of superphosphate. The resulting mixture is then treated with 220 pounds of aqua ammonia containing 25% $NH_3$. The resulting mixture is then dried and cured to obtain a product having satisfactory physical characteristics as a fertilizer.

*Example IV.*—About 40 parts of a solution of ammonium nitrate and water containing 70% ammonium nitrate is mixed with about 35 parts of water. Into this solution is introduced 25 parts of ammonia, preferably as liquid ammonia. This solution is then mixed with superphosphate, with or without other materials, in such quantity that there is available about 2 molecular weights of ammonia for reaction with each molecular weight of water soluble $P_2O_5$ in the superphosphate. The chemical reactions which take place and which result in the liberation of heat exercise a drying action on the mixture and a product is obtained which dries quickly to a friable material which is stable, easily handled, relatively non-hygroscopic, and of excellent fertilizer value.

In preparing a fertilizer according to the foregoing procedure, the aqueous ammoniacal solution of ammonium nitrate which is added to the superphosphate contains the following ingredients in the indicated proportions by weight: 28 parts ammonium nitrate, 25 parts ammonia and 47 parts water. The liquid composition, therefore, corresponds to a solution of ammonium nitrate in an aqua ammonia containing about 35% $NH_3$. In adding such a composition to superphosphate so that about 2 molecular weights of ammonia are available for reaction with each molecular weight of water soluble $P_2O_5$, about 150 pounds of the foregoing liquid composition would be added to 1000 pounds of superphosphate. This corresponds to about 42 pounds of ammonium nitrate and 37.5 pounds of ammonia for every 1000 pounds of superphosphate.

*Example V.*—47.2 parts of superphosphate, 8 parts of ammonium nitrate, 20 parts of manure salts, and 18.8 parts of filler, for example sand, are mixed and the mixture so obtained is treated with 6 parts of ammonia liquor containing about 25% ammonia. In preparing this fertilizer the proportions of ammonium nitrate, ammonia and superphosphate used correspond to about 170 parts of ammonium nitrate and 32 parts of ammonia for every 1000 parts of superphosphate.

*Example VI.*—41 parts of superphosphate, 20 parts manure salts, 12.5 parts sulfate of ammonia, 10 parts organics and 9 parts sand are admixed and the admixture so obtained treated with 7.5 parts of a solution of ammonium nitrate in liquid ammonia containing about 3.3 pounds ammonium nitrate per pound of ammonia ($NH_3$). In this example the ammonia is employed in the proportions of 42.5 parts of ammonia to every 1000 parts of superphosphate.

*Example VII.*—85 parts of superphosphate are treated with 15 parts of a solution of ammonium nitrate in liquid ammonia containing 3.3 pounds of ammonium nitrate for every one pound of ammonia ($NH_3$). In this example the ammonia is employed in the proportions of 41 parts of ammonia to every 1000 parts of superphosphate.

*Example VIII.*—About 76.5 parts of superphosphate are treated with 23.5 parts of a solution consisting of 66.7% ammonium nitrate, 13.3% ammonia and 20% water. In thus preparing a fertilizer the ammonium nitrate, ammonia and superphosphate are employed in the proportions of about 205 parts of ammonium nitrate and about 40 parts of ammonia for every 1000 parts of superphosphate. The solution containing ammonium nitrate, ammonia and water corresponds to a solution of ammonium nitrate in an aqua ammonia containing about 40% $NH_3$.

*Example IX.*—34.8 parts of triple superphosphate, 15.8 parts of ammonium nitrate, 16 parts of muriate of potash and 21.4 parts of filler, for example sand, are admixed and the admixture so obtained treated with 12 parts of ammonia in the form of a 25.7% ammonia liquor. In this example the ammonia is employed in the proportions of 89 parts of ammonia to every 1000 parts of triple superphosphate.

*Example X.*—33.4 parts of triple superphosphate containing about 45% P₂O₅, 3.3 parts of ammonium sulfate, 15 parts of peat, 16 parts of muriate of potash and 15.3 parts of filler, for example sand, are admixed and the admixture thus obtained is treated with 17 parts of a solution containing ammonium nitrate and ammonia in the proportions of about 3 pounds of ammonium nitrate per pound of ammonia (NH₃) and formed by dissolving ammonium nitrate in anhydrous ammonia and diluting the solution thus obtained with water to give a 50% aqua strength. In this example the ammonia is employed in the proportions of about 103 parts of ammonia for every 1000 parts of triple superphosphate.

The invention affords a simple and effective method of preparing fertilizer mixtures and permits the utilization of ammonia in making up mixed fertilizers from superphosphate while minimizing the loss of available P₂O₅ due to the tendency of the ammonia to convert P₂O₅ in the superphosphate to a citrate insoluble unavailable form. As indicated in Examples V, VI, IX and X, the fertilizers of this invention may be prepared employing in addition to the superphosphate, ammonium nitrate, ammonium sulfate and ammonia, others of the numerous fertilizer ingredients known to the trade. Thus the fertilizer composition may include potassium chloride, potassium sulfate, potassium nitrate, sodium nitrate, urea, ammonium chloride, ammonium phosphate, and the like, which may be added to the superphosphate either prior to, simultaneously with, or after its treatment with the ammonia and ammonium nitrate.

We claim:

1. The process for the preparation of fertilizers which comprises treating a superphosphate material with ammonium nitrate in the proportions of above about 40 pounds ammonium nitrate to every 1000 pounds of said superphosphate and with ammonia in amount substantially greater than that corresponding to the equation $NH_3 = .00128 \times \% \ P_2O_5 \times$ phosphate.

2. The process for the preparation of fertilizers which comprises treating superphosphate material with ammonium nitrate in the proportions of above about 40 pounds ammonium nitrate to every 1000 pounds of said superphosphate and with ammonia in amount substantially greater than 23 pounds of ammonia for every 1000 pounds of superphosphate.

3. The process for the preparation of a fertilizer which comprises incorporating with superphosphate, ammonium nitrate, ammonia and water in the proportions of about 100 to 200 pounds of ammonium nitrate and substantially more than 23 pounds of ammonia for every 1000 pounds of superphosphate, said water and ammonia being employed in a ratio above 3 to 2.

EDWARD W. HARVEY.
RUSSELL M. JONES.